July 9, 1935.  A. Y. DODGE  2,007,707
LUBRICATION DEVICE
Filed Feb. 24, 1932  3 Sheets-Sheet 1
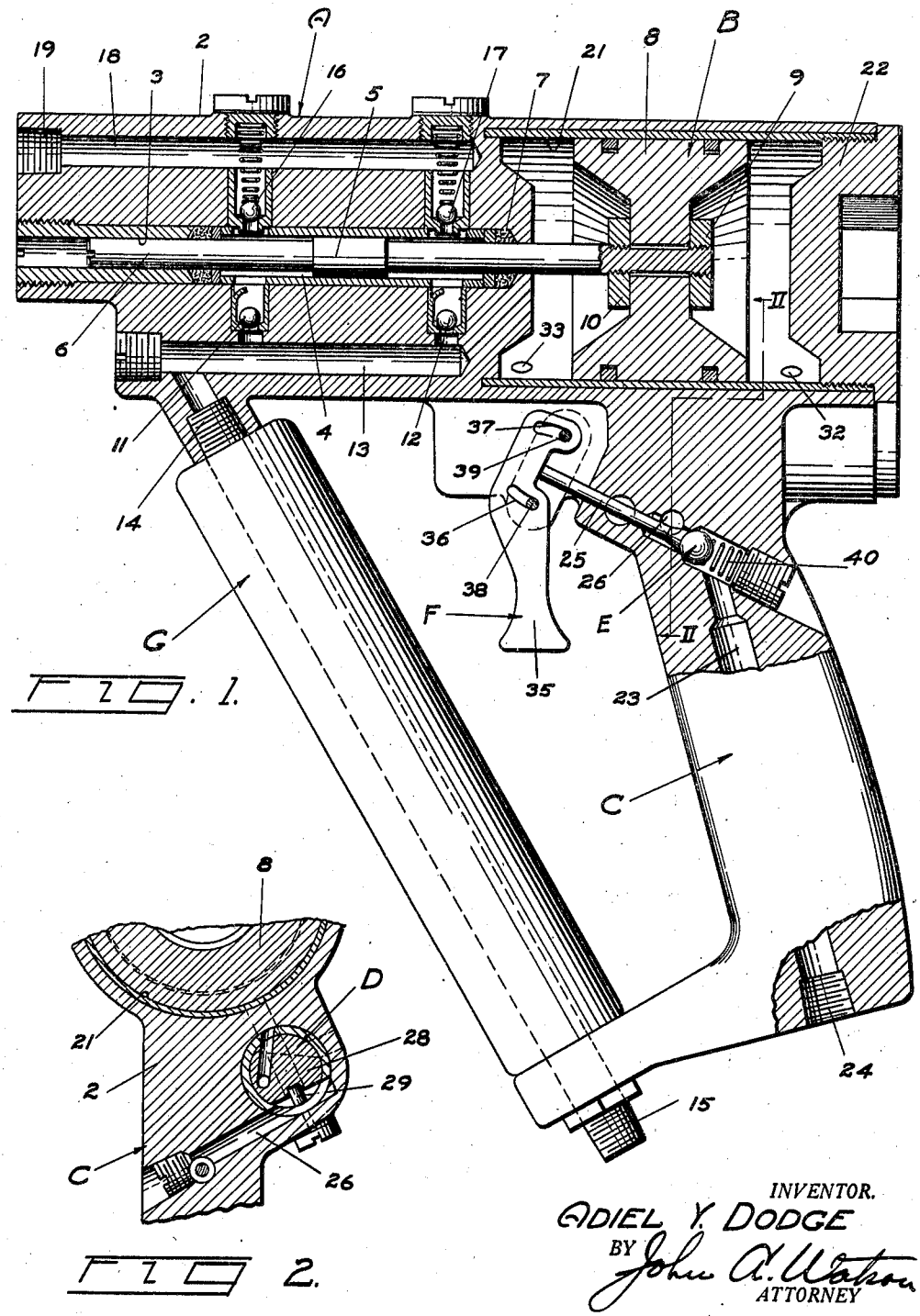
INVENTOR.
ADIEL Y. DODGE
BY
ATTORNEY July 9, 1935.  A. Y. DODGE  2,007,707
LUBRICATION DEVICE
Filed Feb. 24, 1932  3 Sheets-Sheet 2

INVENTOR.
ADIEL Y. DODGE
BY
ATTORNEY

July 9, 1935.  A. Y. DODGE  2,007,707
LUBRICATION DEVICE
Filed Feb. 24, 1932   3 Sheets-Sheet 3

INVENTOR.
ADIEL Y. DODGE
BY
ATTORNEY

Patented July 9, 1935

2,007,707

UNITED STATES PATENT OFFICE 2,007,707

LUBRICATION DEVICE

Adiel Y. Dodge, South Bend, Ind., assignor to The Lubrication Corporation, South Bend, Ind., a corporation of Delaware Application February 24, 1932, Serial No. 594,823

12 Claims. (Cl. 221—47.3)

This invention relates to lubrication devices and more particularly to power operated lubricant guns or pumps by means of which lubricant may be supplied under relatively high pressure to bearings and similar parts which are to be lubricated.

One of the objects of the invention is to provide an improved power operated lubricant gun.

Another object is to provide, in a hand unit lubricant gun, a double action trigger arranged for manual movement in either direction for controlling the gun.

Another object is to provide, in a trigger controlled hand lubricant gun, two hand grips, one for use in manually supporting the gun and one for suspending the gun from the hand, and wherein both of the hand grips are so arranged as to provide accessibility to the trigger of the finger of the supporting hand.

Another object is to provide, in a hand power operated lubricant gun, cartridge means for providing a source of lubricant supply to the gun, having the additional function of serving as a manually engageable hand grip.

Another object is to provide in a hand lubricant gun as described, a compact assembly of parts which is relatively light in weight and therefore one which will not inconvenience or tire the operator of the gun during use.

Other objects, the advantages, and the uses of the invention will be, or should become, apparent after reading the following description and claims and after consideration of the accompanying drawings forming a part of this specification in which:

Fig. 1 is a sectional view of an air operated lubricant gun illustrating an embodiment of my invention;

Fig. 2 is a sectional view taken along the line II—II of Fig. 1;

Figure 3:
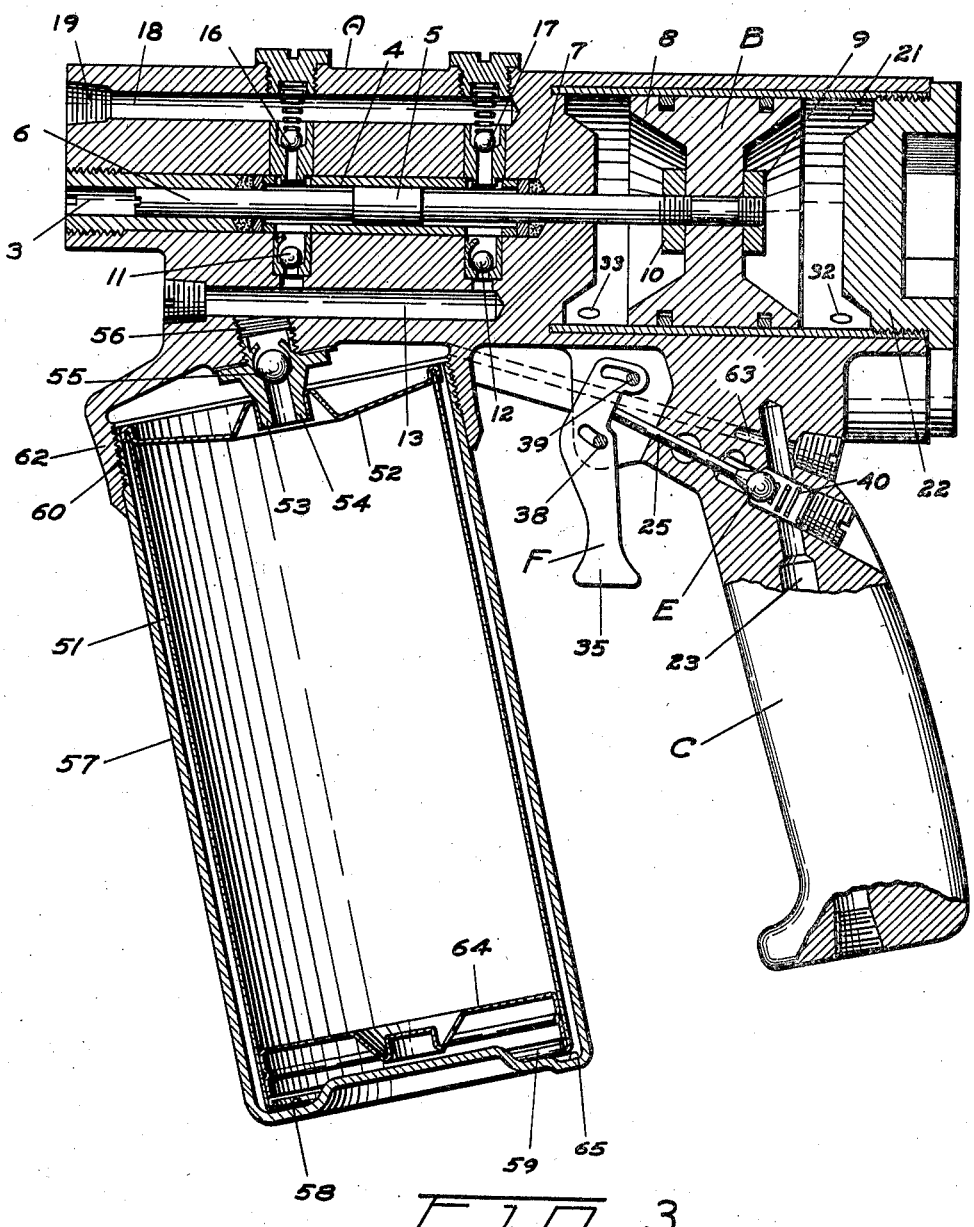
Fig. 3 is a sectional view of a modified form of the lubricant gun illustrated in Fig. 1.

In general, the air operated lubricant gun selected to illustrate my invention comprises a double action high pressure lubricant pump A, an air motor B, a pistol hand grip C for manually supporting the gun, an automatic air valve D for the motor B, a throttle valve E for controlling the motor, a double action trigger F for actuating the throttle valve E and a hand grip G for holding the gun suspended from the hand as when used with a whip end hose and nozzle.

Referring particularly to Fig. 1 the lubricant pump A comprises a body 2 having aligned bores 3 and 4 disposed longitudinally therein. The bore 4 comprises a pressure cylinder within which a pressure piston 5 is slidably disposed. The piston 5 is mounted upon and intermediate the ends of a plunger rod 6. The outer end of the plunger rod is slidably mounted within the bore 3 and the rearward end extends through a packing gland 7 into that region of the gun occupied by the air motor B, where it is secured to the piston 8, of the air motor, by nuts 9 and 10.

Lubricant is admitted to opposite ends of the bore or cylinder 4 through inlet check valves 11 and 12, of the ball type, both of which communicate with an inlet passage 13 connected at its forward end to a tube 14 which forms the supporting core for the hand grip G and is adapted for connection at its lower end 15 with a lubricant supply hose.

Lubricant is discharged from the pump through outlet check valves 16 and 17, disposed at opposite ends of the cylinder 4, both of which communicate with a discharge bore 18 the outer end of which is internally threaded as shown at 19 for interconnection with a discharge nozzle or with a lubricant conducting hose, to which a nozzle may be fixed.

Figure 5:
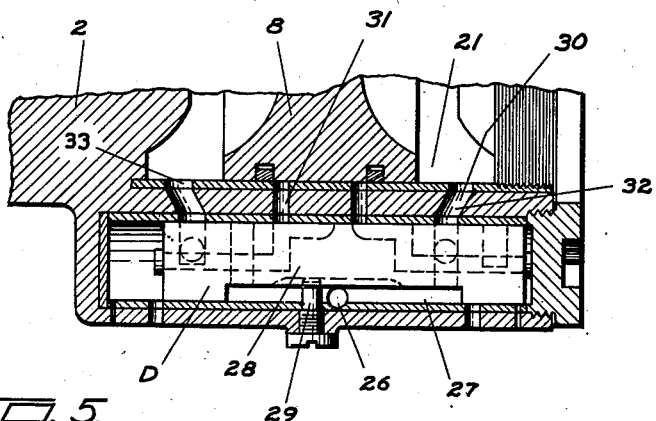
Fig. 5 is a sectional view taken along the line V—V of Fig. 4.

The air motor B comprises a cylinder 21 disposed with its axis aligned with the cylinder 4 and formed in the body 2 of the gun. The piston 8 is slidably mounted within the cylinder 21 and the rear end of the cylinder is closed by a screw plug 22. Air under pressure for operating the motor is admitted through a bore 23 formed in the pistol grip C, by connecting an air hose to the internally threaded portion 44 of the bore at the base of the hand grip. The upper end of the bore 23 communicates with the throttle valve E which is of the ball type. The ball valve when lifted from its seat as by inward thrust upon a valve rod 25, interconnects the bore 23 with a transverse passage 26 communicating with the interior of the valve cylinder 27 (see Fig. 5) of the automatic air valve D.

The automatic air valve D comprises a valve member 28 slidably disposed within the cylinder 21. This valve is actuated by exhaust air from the air motor B admitted through passages 30 and 31 respectively, depending upon the position of the piston 8 in the motor cylinder 21, so as to alternately open ports 32 and 33 respectively in the cylinder 21 through which air admitted from the passage 26 is conducted to propel the piston 8 alternately forwardly and rearwardly, thus reciprocating the lubricant piston 5 in its cylinder 4. The valve member 28 is retained from rotative movement by a stud 29.

The structure of the pump A, the motor B and the automatic valve D is fully illustrated and described in detail in my copending application for patent, Serial No. 594,822, filed Feb. 24, 1932.

Figures 4, 6:
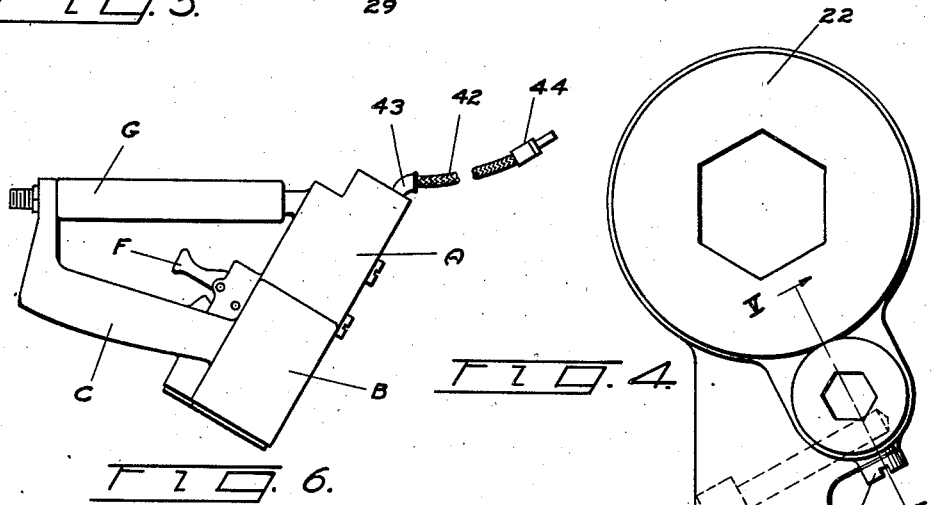
Fig. 4 is a rear elevation of the lubricant gun illustrated in Fig. 1.
Fig. 6 is a schematic view illustrating the gun of Fig. 1 in one of its operative positions.
Figure 7:
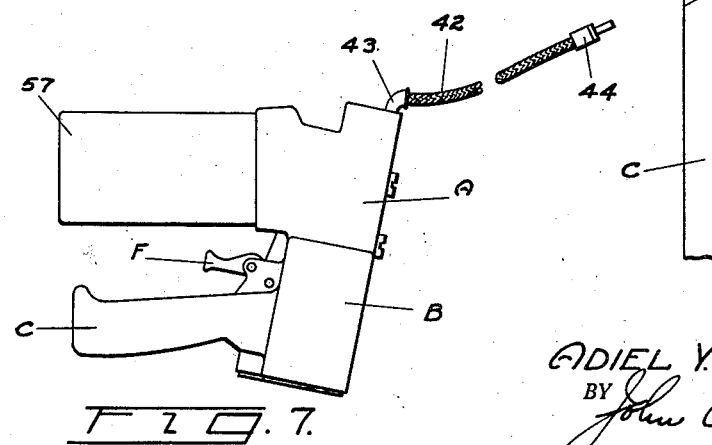
Fig. 7 is a schematic view illustrating the gun of Fig. 3 in one of its operative positions.

The throttle valve E, for controlling the air motor B through movement of the valve rod 25, is actuated by a double action trigger F having a finger engaging portion 35 curved on opposite sides to accommodate the finger during operation. The trigger F is further formed, at its inner end, with a pair of slots 36 and 37 through which pins 38 and 39 respectively extend. The pins are fixed to the body of the gun to form a pivot about which the trigger F may be oscillated, depending upon that direction in which the finger engaging portion 35 is moved. As the trigger is drawn toward the piston hand grip C, as when the gun is supported by manual engagement with the pistol grip, the trigger will pivot upon the pin 38. If, however, the trigger is operated with the gun suspended as by manual engagement with the hand grip G as shown in Fig. 6 of the drawings, it is most convenient to draw the trigger toward the hand grip G and thus it will pivot about the pin 38. In either case movement of the trigger F will cause the valve rod 25, which registers with the trigger F, at that portion between the slots 36 and 37, to be moved inwardly to lift the ball valve E from its seat, against the action of a compression spring 40.

I have thus provided a hand power operated lubricant gun (in the present instance, an air motor operated gun) having two major applications in use, as follows:

First, that of a pistol type air gun, held by manual engagement with the pistol grip C, and which may support a lubricant discharge nozzle immediately connected with the internally threaded portion 19 of the discharge bore 18.

Secondly, a lubricant feeder apparatus or pump which may be held, as for instance in the left hand, and suspended from the hand by engagement with the hand grip G as shown in Fig. 6, with a whip end lubricant hose 42 connected by an elbow 43 with the threaded orifice 19 of the discharge bore 18, and a discharge nozzle 44 connected to the outer end of the hose, to be directed by the right hand of the operator so that it may be engaged with the lubricant fitting or nipple to be lubricated.

When used in either of the two manners, the air motor B may be operated to drive the lubricant pump A continuously, by manually drawing the trigger F toward the hand grip employed for supporting or suspending the gun, an arrangement which greatly facilitates the ease of operation and which provides versatility in use to suit the particular needs for which the gun is at the moment desired.

In Fig. 3 I have illustrated a modification of the gun illustrated in Fig. 1 wherein the lubricant supply is self contained in the form of a replaceable lubricant cartridge 51. The cartridge 51 has a head 52 provided with an outlet opening 53 adapted to engage with a cartridge connector stud 54 so as to form a lubricant tight seal therebetween. The stud 54 includes a ball check valve 55, and, is secured to the body 2 of the gun in a threaded passage 56 communicating with the lubricant inlet passage 13, of the pump A. The cartridge is disposed within a casing 57, the inner end 58 of which is adapted to bear directly upon the outer end 59 of the cartridge, to force the cartridge inwardly against the stud 54, as the externally threaded upper end 60 of the casing is engaged with and screwed into an internally threaded cap 62 formed integral with the body 2 of the gun.

An air passage 63, communicating with the bore 23 and shown partially in dotted lines in Fig. 3, is employed to conduct air under pressure to the interior of the cap 62, where it may pass between the casing and cartridge wall and beneath the lower end 59 of the cartridge to apply air pressure to the rear surface of the cartridge piston 64. The lubricant in the cartridge 51 is thus maintained under pressure so as to aid its discharge from the cartridge through the valve 55 into the lubricant inlet passage 13. In order to assure the passage of air about the outer end 59 of the cartridge, a slight depression 65 is formed on the inner end wall 58 of the casing adjacent to the casing side wall, to provide a by-pass about the end 59 of the cartridge.

In use the hand lubricant gun illustrated in Fig. 3 may be, as in the case of the gun illustrated in Fig. 1, employed for two major uses; that of a pistol type air gun supported by manual engagement with the pistol grip C and having its discharge nozzle 44 connected directly to the threaded portion 19 of the lubricant discharge passage 18, or, it may be suspended from the hand by manual engagement with the outer walls of the casing 57 with the finger free to operate the double action trigger F, in which case the whip end hose 42 is connected to the gun by an elbow 43 and the nozzle 44 is disposed at the outer end of the hose.

It is to be understood that the above described embodiments of the invention are for the purpose of illustration only, and various changes may be made therein without departing from the spirit and scope of the invention.

I claim:

1. A lubricant feeder gun including in unitary assembly, a lubricant pump, a motor for actuating the pump, a pair of hand grips for supporting and suspending the gun, respectively, by and from the hand of the operator, and a trigger operated control for said motor having the trigger mechanism thereof disposed within finger operative reach of both of said hand grips.

2. A lubricant feeder gun, a body, a lubricant feeder apparatus disposed in said body, a pair of hand grips for use, independently, in manually holding the gun, said hand grips having their axes substantially parallel, and a trigger mechanism within finger operative reach of both of said hand grips for controlling said feeder apparatus.

3. A lubricant feeder gun, a body, a lubricant feeder apparatus disposed in said body, a pair of hand grips for use, independently, in manually holding the gun, said hand grips having their axes substantially parallel, and a trigger mechanism within finger operative reach of both of said hand grips for controlling said feeder apparatus, one of said hand grips comprising a casing to confine a source of lubricant supply for said feeder apparatus.

4. A lubricant feeder gun comprising a lubricant pump, an air motor for driving said pump, a throttle valve for operating said air motor, a trigger mechanism for actuating said valve, and means mounting said trigger for opening said valve when the trigger is moved in either of two opposite directions.

5. As an article of manufacture, a double action trigger for imparting right line movement to a control rod comprising a trigger member having a manually engageable portion at one end and a pair of slots formed through the other end, two stationary pins, one extending through each of said slots, to form pivots severally for the trigger member, each slot being so arranged as to clear its associated pin when the trigger is pivoted upon the remaining pin, that portion of said trigger member between said slots being in registration with said control rod.

6. As an article of manufacture, a double action trigger for operation of a control rod comprising a trigger member having two pivotal supports each independently operative to permit angular movement of the trigger member, said member being further arranged to register that portion between its pivotal supports with the end of said control rod whereby pivotal movement of the trigger member on either of its pivotal supports will impart right line movement to said control rod.

7. A lubricant feeder gun comprising an elongated body a lubricant pump, disposed within said body, means for operating said pump, a casing secured to said body for containing a source of lubricant supply for said pump, and a trigger for controlling said pump operating means, said casing extending outwardly and rearwardly from the forward end of said body and within finger reach of said trigger as when the gun is suspended from the hand of the operator by grasping the casing.

8. In a lubricant feeder gun, an air motor operated and reciprocating lubricant pump, means including a control valve for conducting air under pressure to the air motor of said pump, a cartridge receiving casing disposed transversely of the path of reciprocation of said pump, a lubricant supply cartridge disposed in said casing and detachably connected at one of its ends in lubricant supplying relationship with respect to said pump, a follower forming a closure for the other end of said cartridge, and means for admitting air under pressure into said casing and against said follower for urging the follower against the lubricant in the cartridge and toward the pump, said means becoming effective substantially simultaneously with the opening of said air motor control valve, said casing being disposed adjacent to said air admitting means and serving as a supporting means for said gun.

9. A lubricant feeder gun comprising, an elongated body, a lubricant pump and a motor for driving the pump disposed in said body, a lubricant cartridge detachably secured to said body for supplying lubricant to said pump, a follower in said cartridge forming a closure for one end thereof, the axis of said cartridge when attached to said body being transverse to the axis of said body, means at the other end of said cartridge providing a lubricant passageway connecting the cartridge and pump, and a casing for housing said cartridge, said casing also serving as a hand grip for holding the lubricant gun, said casing being spaced from said cartridge sufficiently to permit access of air to said follower.

10. A lubricant feeder gun comprising, an elongated body, a lubricant pump and an air motor for driving said pump disposed in said body, a lubricant cartridge detachably secured to said body for supplying lubricant to said pump, a piston disposed in said cartridge and forming a closure for one end thereof, means at the other end of said cartridge providing a passageway for lubricant to flow from the cartridge to the pump, a casing for housing said cartridge, said casing also serving as a hand grip for holding said lubricant gun, and means for conducting air under pressure to the interior of said casing whereby to urge said cartridge piston toward said other end of said cartridge.

11. A lubricant feeder gun comprising an elongated body, a lubricant pump, disposed within said body, means for operating said pump, a casing secured to said body for containing a source of lubricant supply for said pump, a trigger for controlling said pump operating means, said casing extending outwardly and rearwardly from the forward end of said body and within finger reach of said trigger as when the gun is suspended from the hand of the operator by grasping the casing, and a piston grip handle at the rear end of said body within finger reach of said trigger for supporting the gun in the hand, said trigger being operable by the operator's trigger finger when the casing on the piston grip is used as a handle.

12. In a lubricant feeder gun, an air motor operated lubricant pump, means including an air supply conduit and a control valve for conducting air under pressure to the air motor of said pump, a cartridge receiving casing secured by one end relatively to said pump, a lubricant supply cartridge disposed within said casing and detachably connected at one of its ends in lubricant supplying relationship with respect to said pump, a follower disposed in and forming a closure for the other end of said cartridge, and means for admitting air under pressure from said conduit into said casing and against said follower for urging the lubricant in the cartridge toward said pump, said means becoming effective substantially simultaneously with the opening of said air motor control valve, said casing being disposed adjacent to said air control valve and serving as a supporting means for said gun.

ADIEL Y. DODGE.